Figure 1:
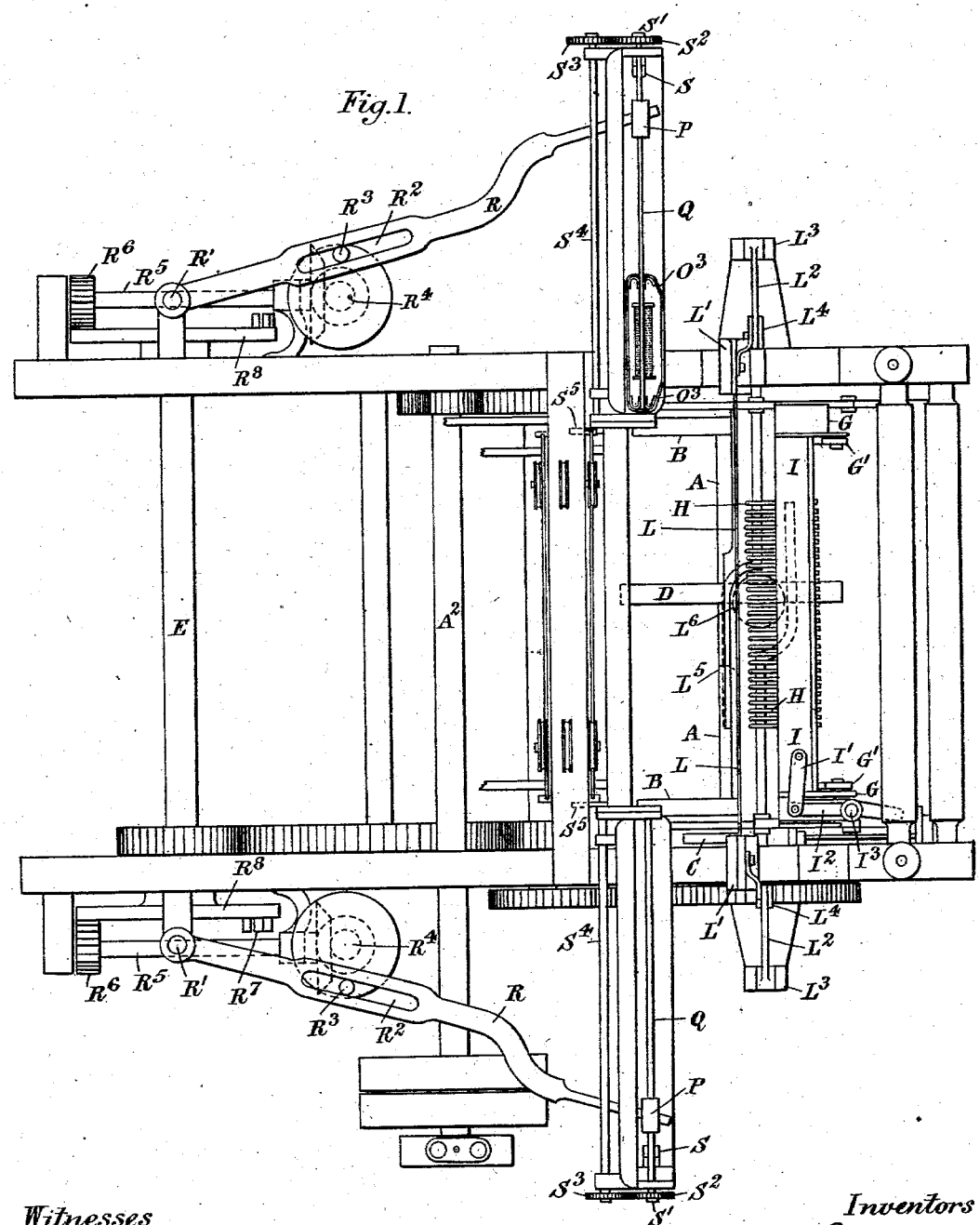

No. 730,339. PATENTED JUNE 9, 1903.
O. BULLOCK & W. H. FORTY.
LOOM FOR THE MANUFACTURE OF COIR MATS.
APPLICATION FILED MAR. 24, 1902.
NO MODEL. 5 SHEETS—SHEET 1.

Witnesses
A. M. Parkins
J. A. MacDonald

Inventors
Owen Bullock &
Wm. Henry Forty,
By their Attorney
Baldwin Davidson Wight No. 730,339. PATENTED JUNE 9, 1903.
O. BULLOCK & W. H. FORTY.
LOOM FOR THE MANUFACTURE OF COIR MATS.
APPLICATION FILED MAR. 24, 1902.
NO MODEL. 5 SHEETS—SHEET 2.
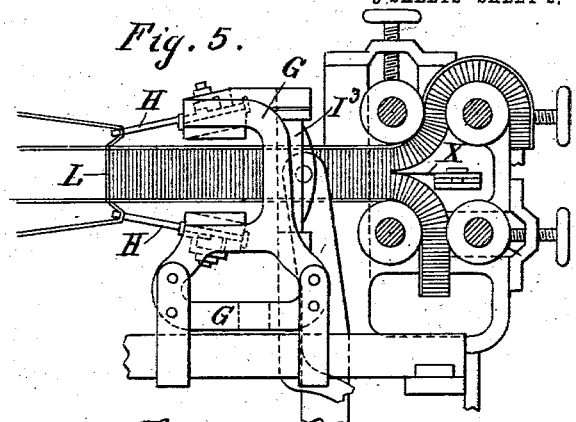
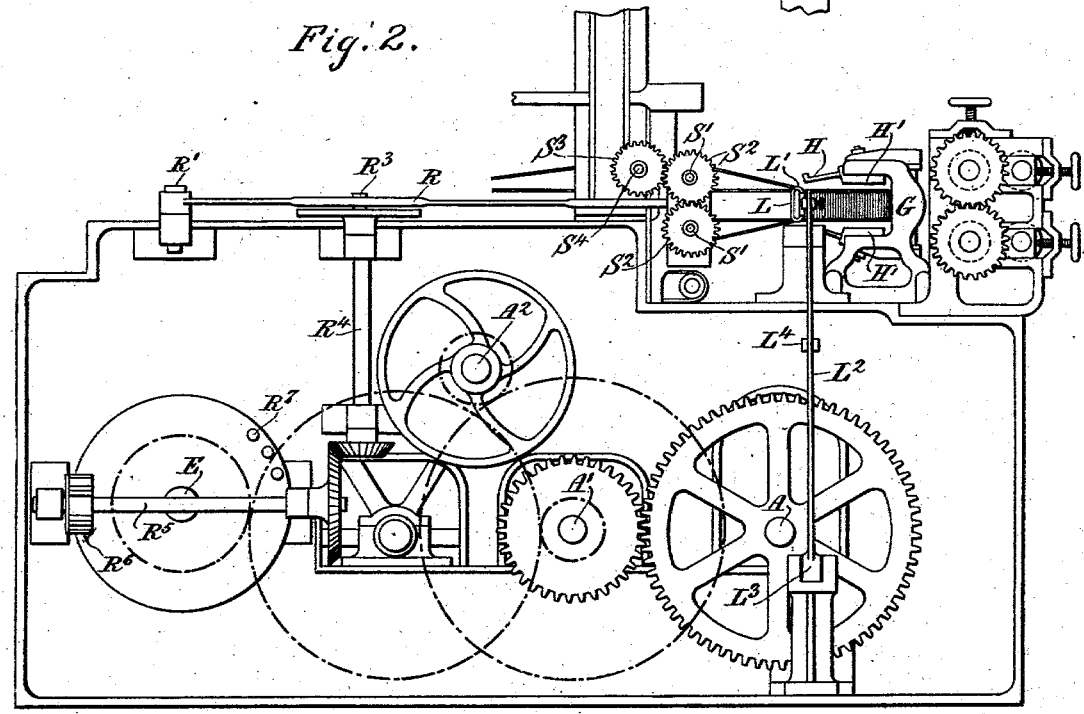
Witnesses.
A. M. Parkins.
J. A. MacDonald
Inventors
Orrin Bullock &
Wm. Henry Forty,
By their Attorneys,
Baldwin, Davidson & Wight

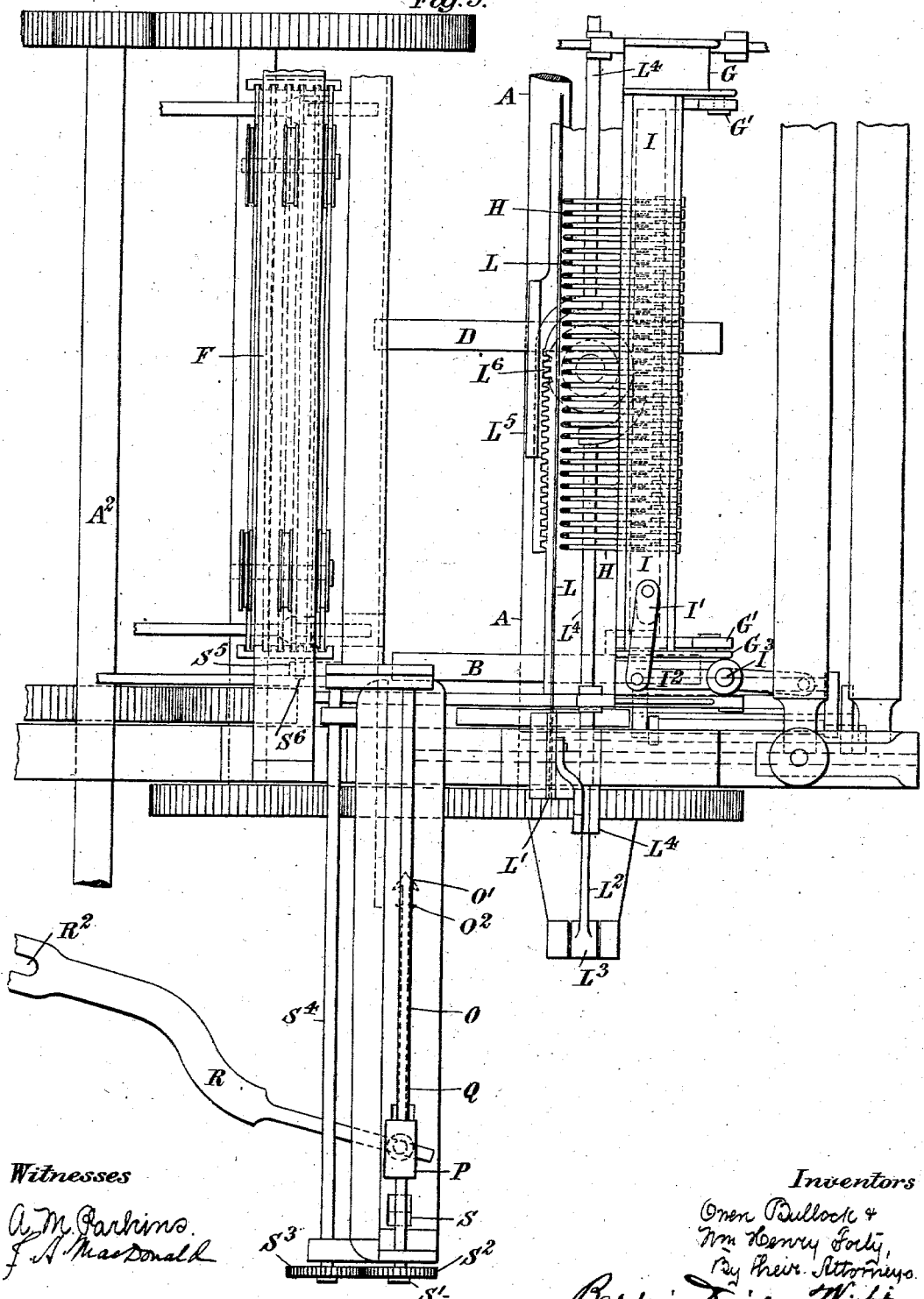

No. 730,339. PATENTED JUNE 9, 1903.
O. BULLOCK & W. H. FORTY.
LOOM FOR THE MANUFACTURE OF COIR MATS.
APPLICATION FILED MAR. 24, 1902.
NO MODEL. 5 SHEETS—SHEET 4.
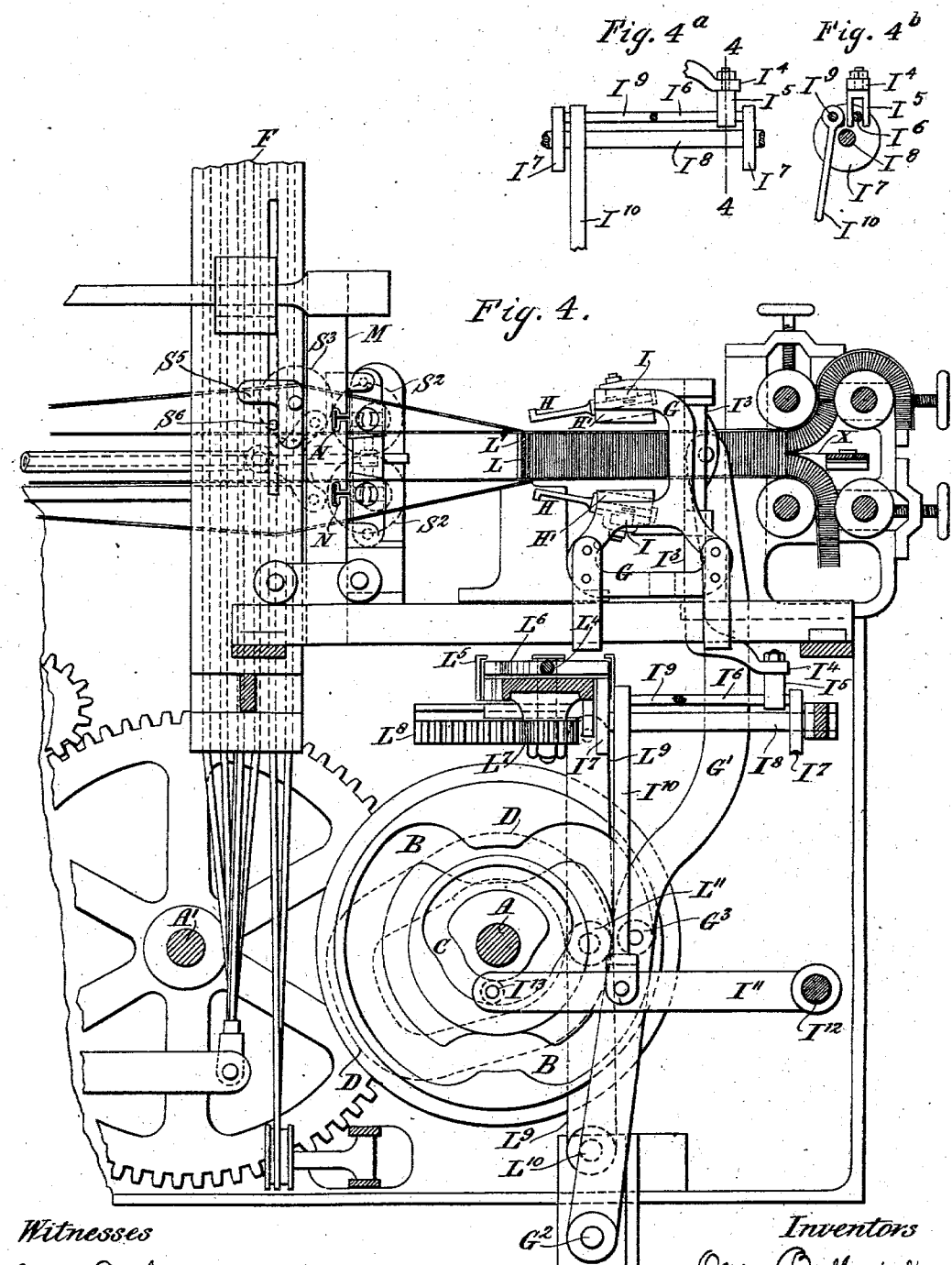

No. 730,339. PATENTED JUNE 9, 1903.
O. BULLOCK & W. H. FORTY.
LOOM FOR THE MANUFACTURE OF COIR MATS.
APPLICATION FILED MAR. 24, 1902.
NO MODEL. 5 SHEETS—SHEET 5.
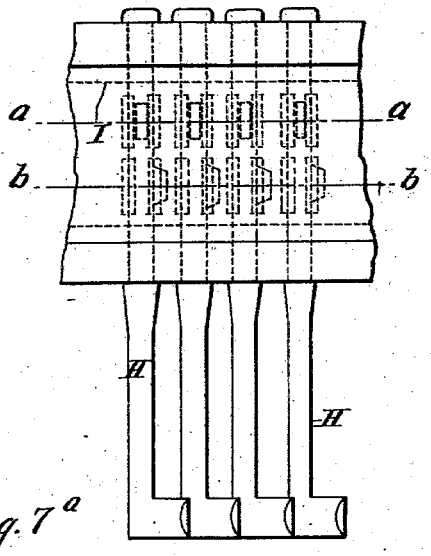
Fig. 7.
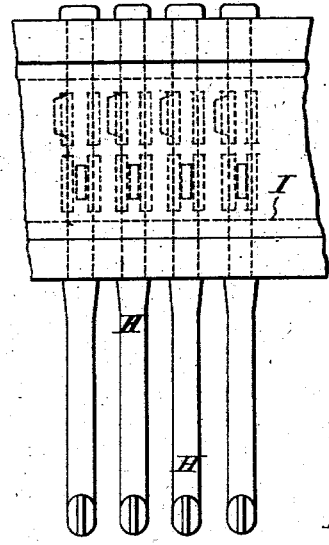
Fig. 6.
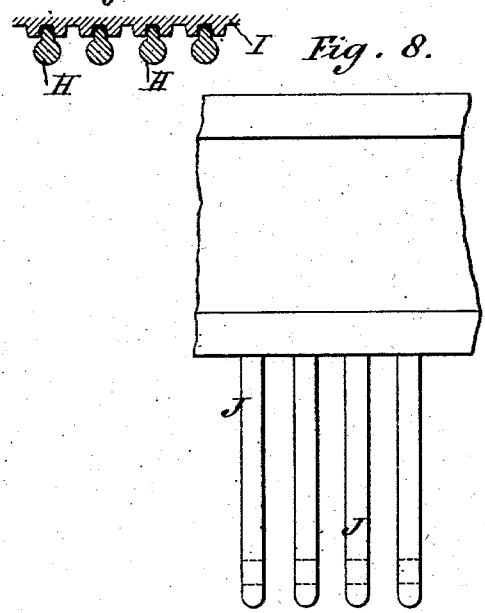
Fig. 8. Fig. 9.
Witnesses.
Inventors No. 730,339. Patented June 9, 1903.

UNITED STATES PATENT OFFICE.

OWEN BULLOCK, OF HEMEL HEMPSTEAD, AND WILLIAM HENRY FORTY, OF BOXMOOR, ENGLAND, ASSIGNORS TO BULLOCK, FORTY & CO., LIMITED, OF HEMEL HEMPSTEAD, ENGLAND.

LOOM FOR THE MANUFACTURE OF COIR MATS.

SPECIFICATION forming part of Letters Patent No. 730,339, dated June 9, 1903.

Application filed March 24, 1902. Serial No. 99,756. (No model.)

*To all whom it may concern:*

Be it known that we, OWEN BULLOCK, residing at Marlows, Hemel Hempstead, and WILLIAM HENRY FORTY, residing at the Woodlands, Boxmoor, in the county of Hertford, England, engineers, subjects of the King of Great Britain, have invented certain new and useful Improvements in Looms for the Manufacture of Coir Mats and the Like, of which the following is a specification.

This invention has for its object improvements in looms for the manufacture of coir mats and the like.

The improvements relate to looms in which the mats or the like are woven double, face to face, as described in the specification of a former patent granted to us, No. 549,182, on November 5, 1895. In such looms there is difficulty in avoiding the formation of projecting loops of weft along the edges of each ground fabric, as the weft when beaten up is brought against the pile-warps at some distance from the "fell" of the fabric and after being brought against these warps cannot be tightened up, owing to the rough nature of the yarn used. Consequently the portion of weft between where it passes from the fabric to the point where it comes against the first or outermost pile-warp forms a loop on one edge of the fabric at each beat-up. To remedy this and to insure that the pile-warps shall be tightly bent over the edges of the flat bars which, as described in the above-mentioned specification, are inserted into the space between the two sets of ground-warps to keep the two grounds at the proper distance apart, we provide two rows of hooks or instruments, one above and the other below the fabric that is being woven, and these each time that the pile-warps are crossed are made to move backward and pass between the pile-warps and then to lay hold of these warps, so that when they again move forward to or slightly beyond the fell of the fabric the pile-warps are bent, and those portions of them which are between the bottom ground and the upper set of hooks and the upper ground and lower set of hooks are brought into a position at right angles to these grounds, so that when flat bars used for the purpose above mentioned have been inserted in the space between the two sheds of ground-warp and the wefts inserted in these sheds have been beaten up the wefts do not come against any portion of the pile-warps until they are brought to the fell of the fabric. Thus the formation of projecting loops of weft along the edges of the fabric is prevented. When the weft has been beaten up, the warps are again crossed, the hooks or instruments release their hold of the pile-warps, and then the pile-warps are doubled over the edges of the flat bars, and this bend is made very sharp when the pile-warps passing from the two grounds are again taken by the hooks and drawn into positions at right angles to the grounds. The two sets of hooks may be mounted on a sliding carriage, moved backward and forward by a cam on a cam-shaft. The acting edges of the hooks or instruments may be at right angles to the stems. When the carriage is moved backward to pass these ends through the pile-warps, the ends are held in a vertical plane, and when they have been passed between the warps a partial turn is given to all, so that when the carriage is again drawn forward the hooked ends come against the warps and draw them forward along with them. This turning movement may be given to the stems of the bars by teeth upon them engaging with teeth on rack-bars, which are moved endwise to and fro at the proper times. The mechanism for giving motion to these bars is so arranged that the bars may be moved endwise whether the sliding carriage be in its forward or backward position or in any intermediate position, or in place of using hooks, which have a turning movement given to them, blades may be employed, each blade having a hole through its end, and when the blades have been passed between the pile-warps a rod may be passed through the holes from one side of the loom, or two rods of half-length might be used to be inserted into the holes from the two opposite sides of the loom, and the pile-warps will become bent over these rods in the same way when the rods are carried back by the blades to the fell of the fabric. The flat bars, which are inserted into the shed to keep the two ground fabrics always at the same distance apart, are arranged to be operated by a lever-arm, which plays to and fro in planes close to the fell of the fabric.

Our improvements are shown in the drawings annexed.

Figure 1 is a plan view of so much of a loom having our improvements applied to it as is necessary for enabling the improvements to be fully understood. Fig. 2 is a side elevation of the same. Fig. 3 is a portion of Fig. 1 on a larger scale. Fig. 4 is a longitudinal section of the front portion of the loom on the same larger scale. Fig. 4$^a$ is a detail view showing part of the mechanism illustrated in Fig. 4. Fig. 4$^b$ shows a section on the line 4 4 of Fig. 4$^a$. Fig. 5 is a similar view of some of the parts shown in Fig. 4, but showing the hooks drawing the pile-warps forward to hold them closely against flat bars. Figs. 6 and 7 are plan views of a portion of one of the hook-bars and some of the hooks carried by it, the hooks being shown in their two positions in the two figures. Fig. 7$^a$ shows a section on the line $a\ a$ of Fig. 7. Fig. 7$^b$ shows a section on the line $b\ b$ of Fig. 7. Figs. 8 and 9 show a modification, in which fixed blades are used instead of turning hooks and a rod passed across through holes in the blades.

In the drawings, A is a cam-shaft revolved continuously by gearing from the shaft A', driven from the driving-shaft A$^2$. On shaft A$^2$ are cams, a pair of cams B for running backward and forward the carriage upon which the two sets of hooks are mounted, another cam C for giving a quarter-turn to the hooks, and another cam D for inserting into and withdrawing from the shed the flat bars which serve to keep the two ground fabrics always at the same distance apart. E is another shaft also receiving a continuous revolving movement from the shaft A'. From the ends of the shaft E motion is given to the shuttle-passing mechanism at each side of the loom.

The mechanism for crossing the ground-warps of each ground fabric and for crossing the pile-warps may be arranged in any ordinary way. Only the heddles F of this mechanism are shown.

G is the carriage upon which the two sets of hooks H are mounted. It can be slid backward and forward along guides forming part of the framing of the loom. To it are coupled the upper ends of levers G', which at their lower ends rock upon pivots G$^2$.

G$^3$ represents trucks carried by their levers and acted upon by the grooves in the cams B.

The stems of the hooks H in each set of hooks are received in bearings in a bar H', fixed to the carriage. One of these bars is secured to the carriage above the fabric that is being woven and the other below it.

I I are bars parallel with the bars H' and capable of being moved endwise to and fro. Each bar has upon it rack-teeth gearing with teeth on the stems of the hooks, so that when the bar is moved endwise a partial turn is given to all the hooks. Preferably, as shown in Figs. 3, 6, and 7, we provide the bars I with two rows of rack-teeth to engage with different teeth projecting from the hook-stems. In this way the stem of each hook need only have two teeth projecting from it, as shown in dotted lines in Figs. 3, 6, and 7, and these teeth can be made of any strength desired.

The bars I receive their to-and-fro endway movement in the following manner: Each bar has coupled to it one end of a link I'. (See Figs. 1 and 3.) The other end of this link is coupled to an arm I$^2$, projecting from a vertical axis I$^3$. Another arm I$^4$ on the lower end of this axis has a swiveling peg I$^5$, projecting downward from it. A vertical slot is formed across the lower end of this peg. Through this slot passes a rod I$^6$, which is of somewhat greater length than the length of to-and-fro travel given to the carriage G. This rod at its ends is fast with two disks I$^7$, fixed upon a spindle I$^8$. Another rod I$^9$ (shown partly broken away in Fig. 4) extends across from one disk to the other. A link I$^{10}$ extends downward from this rod to a lever I$^{11}$, which at one end rocks on a pivot I$^{12}$ and at the other carries a truck I$^{13}$, which enters the cam-groove C. In this way a rocking movement is given to the spindle I$^8$, and this gives a rocking movement to the vertical axis I$^3$, whereby a to-and-fro endway movement is given to the rack-bars I and the hooks H, all simultaneously turned from one position to another. In Fig. 6 they are shown turned into position to allow of their being passed through the pile-warps, and in Fig. 7 they are shown turned into position to pass behind the pile-warps, so that the pile-warps may be drawn forward by them. The same result might be obtained by using instead of the hooks a series of blades J, each having a hole formed through it near its end, as shown in Fig. 8, and when the blades have been carried forward between the pile-warps passing a rod K through the holes in the several blades, as illustrated in Fig. 9. We, however, prefer the arrangement above described.

L L are the two flat blades which are inserted into the shed to keep the two ground fabrics always at the same distance apart. Each blade is capable of sliding endwise to and fro through fixed guides L', one at each side of the loom. Each blade is coupled by a link to the upper end of a vertical arm L$^2$, free to rock upon a pivot L$^3$ at its lower end. Each lever has also jointed to it midway of its length one end of a bar L$^4$, which at its opposite end can slide endwise through fixed horizontal guides L$^5$. Rack-teeth are formed on this end of the bar, and the rack-teeth of both bars are made to gear with a pinion L$^6$, one with one side of this pinion and the other with the opposite side. The axis of the pinion turns in a fixed bearing and has upon its lower end a pinion L$^7$. A toothed rack L$^8$, which can be slid endwise to and fro, gears with this pinion, and the rack is shifted to and fro by one end of it being coupled to the upper end of an arm $L^9$, (see Fig. 4,) which can be rocked on a pivot $L^{10}$ at its lower end. The arm receives its rocking movement by a truck $L^{11}$, mounted upon it, entering the cam-groove of the cam D.

The shuttle mechanism is included in another application for patent filed by us on July 28, 1902, Serial No. 117,379.

The action of the mechanism is as follows: After the batten has beaten up and as it retires the flat blades L are moved endwise into the space between the two sets of ground-warps used for forming the two ground fabrics. The pile-warps are then crossed, the carriage G moves back, passing the hooks H between the pile-warps, the upper set of hooks being passed between the pile-warps, which have been raised up from the lower ground fabric, and the lower hooks through the pile-warps, which have been lowered from the upper ground fabric. A quarter-turn is then given to all the hooks and the carriage G drawn back, so that the hooks are brought to or a little past the fell of the fabric, so that the pile-warps held by the hooks are bent sharply over the top and bottom edges of the blades L. The ground-warp sheds are then opened, the blades L are withdrawn, and the shuttles passed through the ground-warp sheds. The carriage G during this time has been again run back and the hooks H turned to release the pile-warps, and when the shuttles have been passed through the ground-warp sheds the batten is caused to beat up. It may either make a single beat or two beats in succession, if desired, and these operations are repeated continuously.

X is a cutting-knife reciprocating to and fro in any ordinary manner for severing the pile.

The parts of the drawings which are marked with letters of reference M to S are parts for giving a to-and-fro motion to the shuttle and correspond with similarly-marked parts in another application for patent, Serial No. 117,379, filed by us, in which their action is fully explained.

What we claim is—

1. The combination of the flat blades, means for inserting these blades into and withdrawing them from the space between the two sets of ground-warps just in rear of the "fell" of the fabric, means for alternately raising one half of the pile-warps and lowering the other, two sets of instruments for taking hold of the pile-warps after they have been crossed, one set being above and the other below the level of the fabric that is being woven, means for moving back these instruments to lay hold of the pile-warps and for then drawing them forward to cause the pile-warps to be bent over the edges of the blades and to lie closely against their back face.

2. The combination of the flat blades, means for inserting these blades into and withdrawing them from the space between the two sets of ground-warps just in rear of the "fell" of the fabric, means for alternately raising one half of the pile-warps and lowering the other, the two sets of hooks, the carriage upon which they are mounted, means for giving a backward-and-forward movement to this carriage, means for giving a partial turn to all the hooks after the carriage has been run back to cause the ends of the hooks to come in rear of the pile-warps.

3. The combination of the batten, the flat blades, means for inserting these blades into the space between the two sets of ground-warps just in rear of the "fell" of the fabric, means for crossing the pile-warps when the blades have been inserted, two sets of instruments for taking hold of the pile-warps after they have been crossed, one set being above and the other below the level of the fabric that is being woven, means for then drawing forward these instruments to cause the pile-warps to be bent over the edges of the blades and to lie closely against their back faces, and means for afterward withdrawing the blades, for crossing the ground-warps in each set of ground-warps and for passing shuttles through the two sheds so opened.

4. The combination of the batten, the flat blades, means for inserting these blades into the space between the two sets of ground-warps just in rear of the "fell" of the fabric, means for crossing the pile-warps when the blades have been inserted, the two sets of hooks, the carriage upon which they are mounted, means for moving back the carriage after the pile-warps have been crossed to pass the hooks between the pile-warps, means for then giving a partial turn to all the hooks to bring their ends in rear of these warps, means for then moving forward the carriage to draw back the pile-warps and cause them to be bent over the edges of the blades and to lie closely against their back face, and means for afterward withdrawing the blades for crossing the ground-warps and for passing shuttles through the two sheds.

5. The combination of the sliding carriage G, the two sets of hooks H carried by it, the lever-arms G' to which the carriage is coupled the trucks $G^3$ on these arms, the cams B on the revolving axis A acting on these trucks, the sliding bars I, the rack-teeth on these bars gearing into teeth on the stems of the hooks, the arms $I^2$ to which the bars I are coupled, the vertical axis $I^3$ to which the arms are fixed, the arm $I^4$ also fixed on this axis, the peg $I^5$ at the end of this arm, the rod $I^6$ acting on this peg, the disks $I^7$ to which the ends of the rod are fixed, the link $I^{10}$ extending downward from another rod also fixed to the disks, the lever-arm $I^{11}$ to which the lower end of the link is coupled, the truck $I^{13}$ on the end of the arm and the cam C acting on this truck.

6. The combination of the blades L, the vertical arms to which they are coupled, the bars $L^4$ jointed to the arms midway of their length, rack-teeth on these bars, the pinion $L^6$ with which the rack-teeth gear, the teeth on one bar gearing with one side of the pinion and the teeth on the other with the opposite side of the pinion, the pinion $L^7$ fast with the axis of the pinion $L^6$, the toothed rack $L^8$ gearing with the pinion $L^7$, the arm $L^9$ to which $L^8$ is coupled and the truck $L^{11}$ acted on by the cam D.

OWEN BULLOCK.
WILLIAM HENRY FORTY.

Witnesses:
WILFRED CARPMAEL,
JOHN H. WHITEHEAD.